US006205405B1

United States Patent
Pouvreau

(10) Patent No.: US 6,205,405 B1
(45) Date of Patent: Mar. 20, 2001

(54) DEVICE FOR DETERMINING THE RESISTIVE TORQUE OF A ROTATING ITEM OF EQUIPMENT, SYSTEM FOR MONITORING THE OPERATION OF AN ELECTRIC MOTOR AND SYSTEM FOR REGULATING THE OPERATING PARAMETERS OF A CENTRIFUGE INCORPORATING SUCH A DEVICE

(75) Inventor: Michel René Muie Jacques Pouvreau, Pontchateau (FR)

(73) Assignee: Jouan, Saint Herblain (FR)

( * ) Notice: Subject to any disclaimer, the term of this patent is extended or adjusted under 35 U.S.C. 154(b) by 0 days.

(21) Appl. No.: 08/939,006

(22) Filed: Sep. 26, 1997

(30) Foreign Application Priority Data

Sep. 27, 1996 (FR) .................................................. 96 11822

(51) Int. Cl.$^7$ ..................................................... G01L 1/00
(52) U.S. Cl. .................................................... 702/41
(58) Field of Search ................................. 702/41, 33, 38, 702/42–44, 57, 64, 65, 96, 105, 113–115, 142, 145–148, 130, 132, 133, 136, 182–185, FOR 123, FOR 124, FOR 126, FOR 135, FOR 142, FOR 150, FOR 151, FOR 171; 318/430, 434, 798; 700/21, 26, 27, 63, 78–81, 261, 275, 278, 299, 304; 324/772, 160, 161, 167; 361/236–238, 242, 243; 701/71, 82, 72; 303/163–165, 112; 290/44, 55; 340/453

(56) References Cited

U.S. PATENT DOCUMENTS

| 4,413,325 | * | 11/1983 | Elfner et al. | 702/132 |
| 4,461,957 | | 7/1984 | Jallen | 290/44 |
| 4,651,142 | * | 3/1987 | Klutt | 340/453 |
| 4,818,927 | * | 4/1989 | Hino et al. | 318/798 |
| 5,255,192 | * | 10/1993 | Ito et al. | 701/72 |
| 5,577,812 | * | 11/1996 | Hirano et al. | 303/165 |
| 5,680,025 | * | 10/1997 | Bowers, III et al. | 318/430 |
| 5,726,881 | * | 3/1998 | Inaniwa et al. | 700/79 |

FOREIGN PATENT DOCUMENTS

| 0645879 A1 | * | 3/1995 | (EP) . |
| 58003592 | * | 1/1983 | (JP) . |
| 63088416 | * | 4/1988 | (JP) . |
| 07167287 | * | 7/1995 | (JP) . |

* cited by examiner

Primary Examiner—Hal Wachsman
(74) Attorney, Agent, or Firm—Larson & Taylor, PLC

(57) ABSTRACT

A device for determining the resistive torque of an item of equipment driven by an asynchronous electric motor operated by a control unit delivering to the motor an alternating voltage for controlling the rotational speed of the motor includes a measuring unit for measuring the rotational speed, a calculator for calculating the motor slip from the said rotational speed and the synchronous speed of the magnetic field generated by the power-supply voltage and a comparator for comparing the calculated value of slip and a set of predetermined slip values each corresponding to a resistive torque value, so that the resistive torque of the item of equipment can be determined.

6 Claims, 2 Drawing Sheets

DEVICE FOR DETERMINING THE RESISTIVE TORQUE OF A ROTATING ITEM OF EQUIPMENT, SYSTEM FOR MONITORING THE OPERATION OF AN ELECTRIC MOTOR AND SYSTEM FOR REGULATING THE OPERATING PARAMETERS OF A CENTRIFUGE INCORPORATING SUCH A DEVICE

FIELD OF THE INVENTION

The present invention relates to a device for identifying the resistive torque of an item of equipment driven in rotation by an asynchronous electric motor, which is particularly suited to identifying a type of equipment with which a centrifuge is equipped, as well as for controlling operating parameters of the centrifuge.

DESCRIPTION OF THE RELATED ART

In the prior art, resistive-torque identification is based on calculating the moment of inertia of the item of equipment and thus requires the use of special sensors and a complicated calculation unit.

SUMMARY OF THE INVENTION

The purpose of the invention is to provide a device for identifying the resistive torque of an item of equipment rotationally driven by an asynchronous electric motor with a view to identifying the type of equipment, which is of a simple structure and does not require the provision of special sensors and a complicated calculation unit.

Another purpose of the invention is to provide a system for controlling or regulating operating parameters of a centrifuge on the basis of the knowledge of the type of equipment being driven by the motor.

Its subject is therefore a device for identifying the resistive torque of an item of equipment driven in rotation in association with an asynchronous electric motor operated by a control unit delivering to the said motor an alternating power-supply voltage for controlling the rotational speed of the said motor, characterized in that it comprises means for measuring the rotational speed of the said motor, means for calculating a characteristic that represents the motor slip and, associated with the said calculation means, means for comparing the calculated value of the said characteristic with a set of predetermined slip values stored in a memory associated with the said comparison means and each corresponding to a resistive torque value, so that the resistive torque value of the said item of equipment can be identified.

Advantageously, the means for calculating the characteristic that represents the slip of the motor comprise means of comparing the synchronous speed of the magnetic field generated by the power-supply voltage with the measured rotational speed of the motor.

According to another feature of the invention, since the said characteristic that represents the slip of the motor is a characteristic that depends on temperature, the device further includes means for measuring the air temperature around the item of equipment with a view to increasing the accuracy with which the resistive torque is identified.

As a preference, the rotationally driven item of equipment consists of the rotor of a centrifuge.

Another subject of the invention is a system for monitoring the operation of a centrifuge comprising an asynchronous electric motor operated by a control unit delivering to the said motor an alternating power-supply voltage for controlling the rotational speed of the said motor, characterized in that the control unit comprises a resistive-torque identification device as defined hereinabove and in that the said control unit comprises means for comparing the resistive torque value for the rotating item of equipment delivered by the said resistive-torque identification device with a resistive torque value stored in the said control unit and corresponding to the resistive torque of an item of equipment that the motor is allowed to drive at a given rotational speed, with a view to monitoring the compatibility between the rotationally driven item of equipment and the motor.

According to a specific embodiment, the control unit comprises means of limiting the rotational speed of the said item of equipment, these means being designed to limit the rotational speed of the said item of equipment to a maximum permitted value of the rotational speed of the said item of equipment.

Another subject of the invention is a system for controlling operating parameters of a centrifuge of the type comprising an asynchronous electric motor operated by a control unit delivering to the said motor a power-supply voltage for controlling the rotational speed of the said motor and rotationally driving a rotor arranged in a chamber and means for regulating operating parameters of the said centrifuge, characterized in that it comprises a resistive-torque identification device as defined hereinabove, and in that the said control unit comprises means for storing a set of resistive torque values each corresponding to a type of rotor and each associated with a set of parameters for regulating the operation of the said centrifuge corresponding to the said type of rotor, and means for comparing the resistive torque value delivered by the said resistive-torque identification device with the said values stored in the said memory means with a view to identifying the type of rotor with which the said centrifuge is equipped and delivering to the regulation means the values of the regulation parameters corresponding to the said rotor.

BRIEF DESCRIPTION OF THE DRAWINGS

Other features and advantages of the invention will become clear from the following description given merely by way of example and made with reference to the appended drawings in which.

DESCRIPTION OF THE PREFERRED EMBODIMENTS

Figure 1:
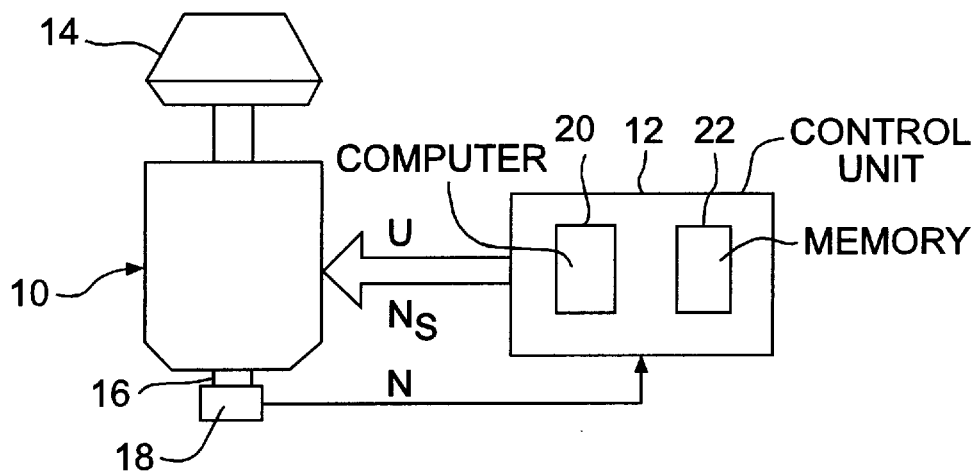
FIG. 1 diagrammatically illustrates the overall structure of the device for identifying the resistive torque according to the invention.

Depicted in FIG. 1 is a motor 10 operated by a control unit 12 delivering an alternating power-supply voltage U to the motor 10.

The motor 10 is a three-phase asynchronous electric motor rotationally driving an item of equipment 14 mounted on the shaft 16 of the motor.

In the known way, the rotational speed of the magnetic field created by the power-supply voltage U, also known as the synchronous speed $N_s$ of the motor 10, is connected to the value of the frequency f of the voltage U by the expression:

$$N_s = \frac{f}{P} \quad (1)$$

in which P denotes the number of pairs of poles of the motor.

Thus the control unit 12 regulates the rotational speed of the motor 10 by regulating the frequency f of the supply voltage U. For example, for an asynchronous motor which has one pair of poles and for a frequency of 50 Hz, the synchronous speed $N_s$ of the motor is equal to 50 revolutions per second, namely 3000 revolutions per minute.

The item of equipment 14 rotates at a rotational speed N below the synchronous speed $N_s$ of the rotating magnetic field.

The difference between the rotational speed N of the motor and the synchronous speed $N_s$ is defined by the motor slip g according to the expression:

$$g = \frac{N_s - N}{N_s} \quad (2)$$

It will be understood that since for a given synchronous speed $N_s$, the slip g is represented by the difference between the synchronous speed $N_s$ and the rotational speed of the motor N, it varies as a function of the rotational speed N of the motor.

However, other operating parameters of the motor 10 may influence the slip value g. This is because the slip g varies as a function of the power-supply voltage U delivered by the control unit 12, of the constructional features of the motor, and of the resistive torque.

Thus for the same motor and for the same power-supply voltage U, the slip g is proportional to the value of the resistive torque for the item of equipment 14.

Figure 2:
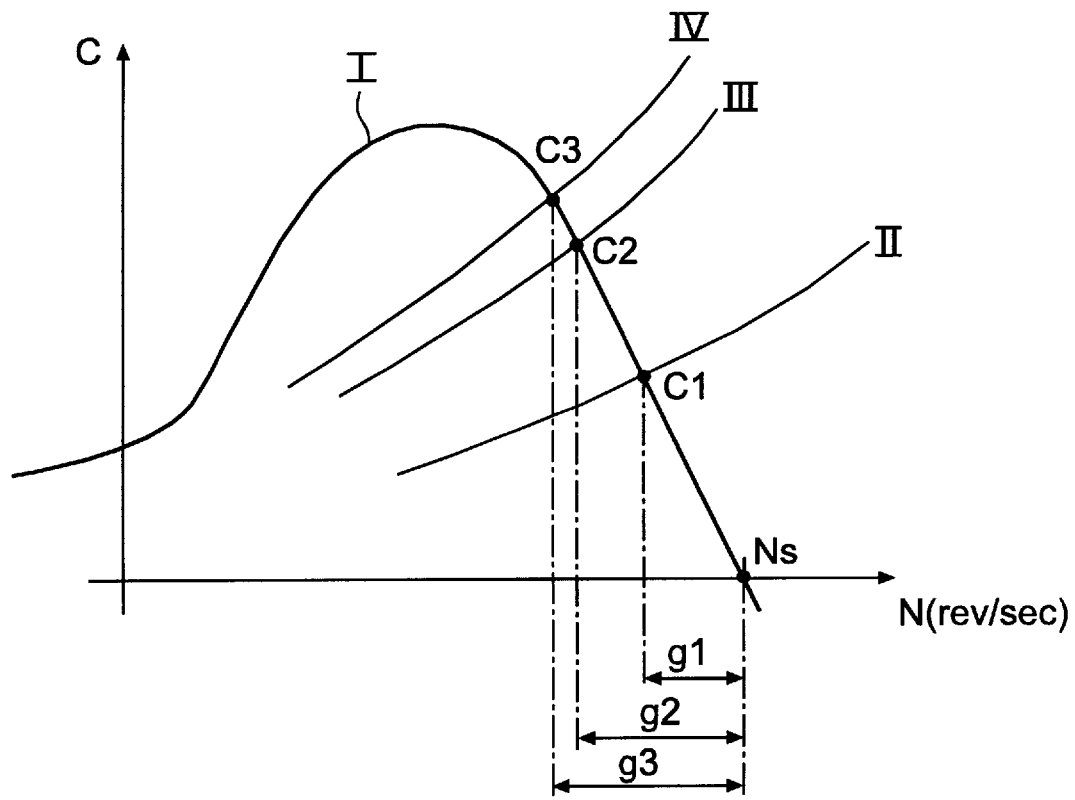
FIG. 2 is a curve showing the driving torque as well as the resistive torque of various types of rotors for a given synchronous speed of the motor.

Depicted in FIG. 2 are the driving torque (curve I) together with the resistive torque for the equipment item 14 for a given synchronous speed $N_s$ of the motor, for various types of equipment item (curves II, III and IV). These curves show that for the same value of synchronous speed $N_s$, various values C1, C2 and C3 of the resistive torque of the item of equipment 14 give various respective slip values g1, g2 and g3.

As the motor 10 may be equipped with an item of equipment 14 selected from a set of items of equipment each having a resistive torque value C, it is thus possible, from knowing the slip g of the motor 10 for a particular item of equipment 14, to discern the resistive torque C of this item of equipment, and thus the type to which it belongs.

To do this, the device depicted in FIG. 1 comprises a member or unit 18 for measuring the rotational speed of the item of equipment 14, fixed to the shaft 16 of the motor and delivering to the control unit 12 the actual value of the rotational speed N of the motor 10.

The measurement member or unit 18 consists of any type of sensor appropriate for the envisaged use, for example a tachymeter, a speed-measurement member of the magnetic or hall-effect type, or alternatively a slotted disc associated with a source of light and with a photoelectric receiver delivering to the control unit 12 electrical pulses the frequency of which varies as a function of the rotational speed N of the motor, or of any other type of measurement means.

Furthermore, the control unit 12 comprises a computer 20 which, using expression (1) mentioned earlier, calculates the synchronous speed $N_s$ of the motor as well as calculating the value of a characteristic that represents the slip g.

This characteristic that represents the motor slip is calculated on the basis of the comparison between the calculated value of the synchronous speed $N_s$ and the actual rotational speed N of the motor 10 delivered by the measurement member 18.

Furthermore, the control unit 12 comprises a memory 22 in which a set of predetermined slip values are stored, each value corresponding to a resistive torque value and being obtained beforehand experimentally by equipping a three-phase asynchronous motor of the same type as the motor 10 with various types of equipment items 14 each having a predetermined resistive-torque value and by determining the corresponding motor slip g for each equipment item.

The control unit 12 therefore, using a comparator situated in the computer 20, makes a comparison between the calculated value of the characteristic that represents the slip g and the slip values stored in the memory 22, thus making it possible to determine the value of the resistive torque of the rotor 14 and therefore the type of rotor that is mounted on the shaft 16.

As was mentioned earlier, this device for identifying the resistive torque can be used to determine the type of equipment with which a centrifuge is equipped with a view to ensuring that a centrifuging cycle proceeds in complete safety and to adapting the parameters for regulating the operation of the centrifuge.

Figure 3:
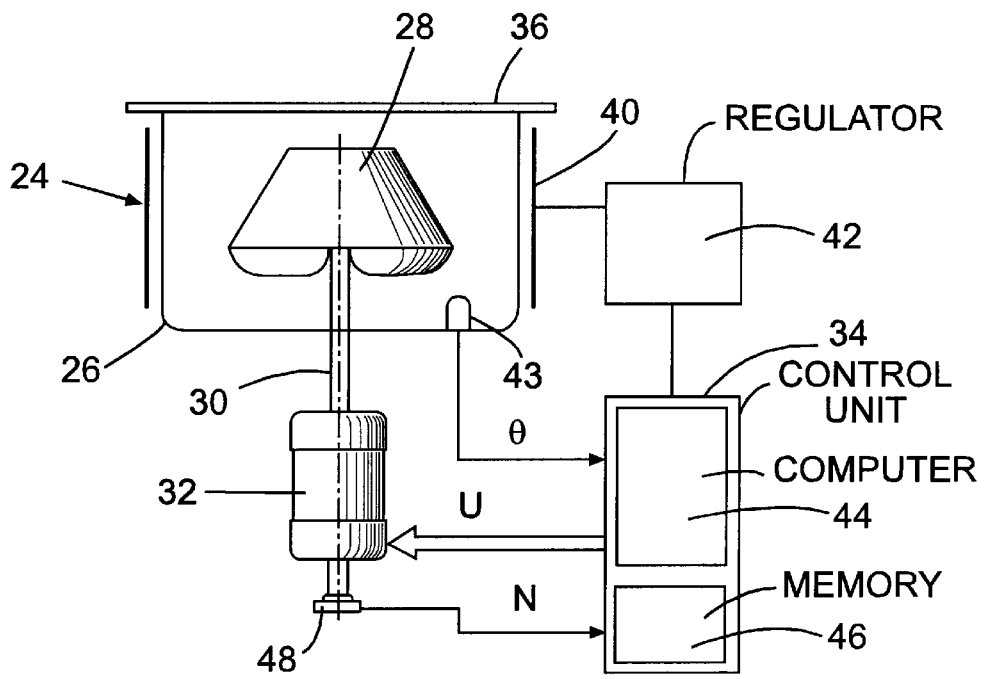
FIG. 3 is a diagrammatic view of a centrifuge equipped with a system for monitoring the operation of the electric motor of the centrifuge and with a system for regulating its operating parameters.

Depicted diagrammatically in FIG. 3 is a centrifuge equipped with a device of this kind.

It can be seen in this FIG. 3 that the centrifuge, denoted by the overall numerical reference 24, comprises a chamber 26 in which there is placed a rotor 28 mounted on the shaft 30 of an asynchronous electric motor 32 operated by a unit 34 which controls its power supply.

In the known way, the rotor 28 comprises means for accommodating tubes containing samples, not depicted, to be centrifuged. A cover 36 is fixed removably over the chamber 26 to allow the rotor 28 to be loaded and unloaded.

Furthermore, the chamber 26 comprises refrigeration means 40 of the conventional type designed to cool the chamber 26 under the control of the control unit 34, by use of a regulator 42 of a conventional proportional, proportional-integral or integral type.

The chamber 26 is also equipped with a sensor 43 that senses the temperature θ of the air present in this chamber, this sensor being connected to the control unit 34.

The control unit 34 is equipped with a device for identifying the resistive torque of the rotor 28 comprising a computer 44 and a memory 46 and making it possible, as mentioned earlier, to identify the resistive torque of the rotor mounted on the shaft 30 by comparing the slip-representative value calculated by the control unit 34 with a set of slip values stored in the memory 46 and obtained earlier experimentally for corresponding resistive torque values.

The resistive torque thus identified then makes it possible to determine the type of rotor to which the rotor mounted on the shaft 30 belongs.

Furthermore, as the rotor slip value g is, as is known, a parameter that depends on the temperature of the air around the rotor, the temperature value delivered by the sensor 43 makes it possible to increase the accuracy with which the resistive torque of the rotor is determined.

It is thus possible, when the slip identified corresponds to several resistive torque values, to discriminate between the types of rotor identified using the measured air temperature and a suitable algorithm.

Figure 4:
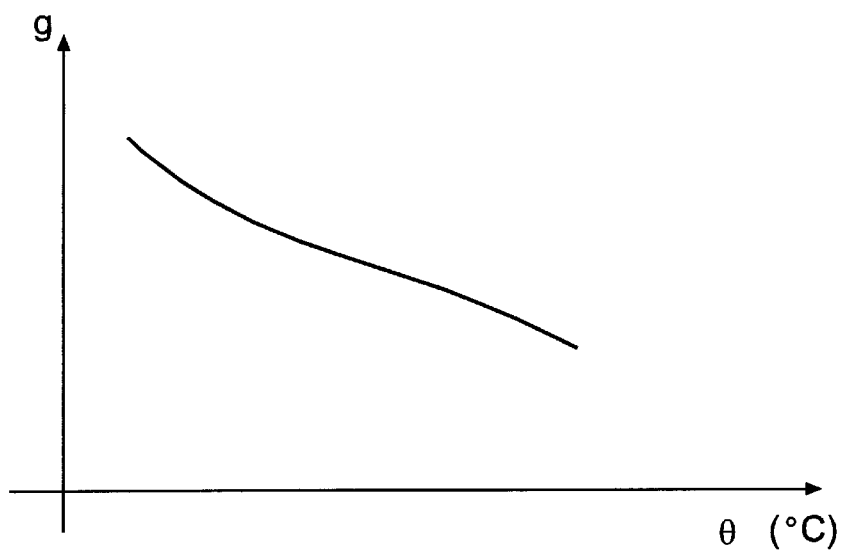
FIG. 4 is a curve showing the variation in slip g as a function of temperature for a given synchronous speed $N_s$.

To do this, the slip values stored in the memory 46 are, in one specific embodiment, values which vary as a function of the temperature θ of the chamber 26, according to the curve depicted in FIG. 4.

It will therefore be understood that the centrifuge is capable, on the basis of the measurement of the rotational speed of the motor 32 as delivered to the control unit 34 by a specific sensor 48, of monitoring the type of rotor mounted on the shaft 30.

Thus, if, owing to an error in the programming of the control unit 34, this unit has recorded a command to drive a rotor 28 at a rotational speed that exceeds the maximum speed permitted for this rotor or for the centrifuge itself, the control unit 34 can detect the incompatibility between the rotor 28 and the speed programmed by the operator and in such a case set off an alarm, using known technology, thus alerting the operator to the detected incompatibility.

Furthermore, in order that the rotor 28 and the centrifuge should not be detrimentally affected, the control unit 34 regulates the frequency f of the power-supply voltage U of the motor 32 to the maximum value for the permitted rotational speed of the rotor 28 and the centrifuge.

Furthermore, as mentioned earlier, the temperature in the chamber 26 is regulated under the control of the control unit 34, so as to keep the temperature in the chamber 26 constant irrespective of the friction generated by the rotation of the rotor 28 which tends to increase the temperature within the chamber 26.

To achieve this, the temperature sensor 43 delivers to the control unit 34 measured values of the temperature of the chamber 26 with a view to regulating this temperature, using regulating techniques which are, in themselves, known.

However, each type of rotor has a specific thermal behaviour, which means that it is necessary to adapt the temperature regulation to suit the type of rotor mounted on the shaft 30.

To allow effective temperature regulation as a function of the mechanical characteristics of the rotor mounted on the shaft 30, the central control unit 34 comprises, in its memory 46, associated with the resistive torque values each corresponding to a type of rotor, a set of predetermined temperature-regulation parameter values each corresponding to a type of rotor and intended for the regulator 42. As before, these temperature-regulation parameters are obtained beforehand from experimental results which in addition make it possible to determine, for each type of rotor likely to be mounted on the shaft 30, the amount of heat generated for the various values of rotational speed.

Thus, the control unit 34 can therefore, from having identified the rotor, determine the optimum parameters for regulating the centrifuge and supply the regulator 42 with the values of these parameters in order to adjust the temperature in the chamber 26.

Likewise, the speed regulation may benefit from the same system of adapting its regulation parameters once the rotor 28 has been identified by the control unit 34.

It will therefore be understood that the centrifuge equipped with a system of this kind makes it possible, on the one hand, to recognize the type of rotor with which the motor is equipped so as to avoid the latter rotating at a speed which is higher than the speed that it or the centrifuge is capable of withstanding and, on the other hand, to adjust the parameters for regulating the operation of the centrifuge to suit the type of rotor and the rotational speed of the motor.

What is claimed is:

1. A system for monitoring the operation of a centrifuge, said system comprising an asynchronous electric motor and a control unit for supplying alternating current voltage to said motor so as to control the rotational speed of said motor, said control unit comprising:

a device for determining the resistive torque of a rotor of the centrifuge driven by said motor, said device comprising:

measuring means for measuring the rotational speed of said motor, calculating means for calculating a characteristic representative of the slip of said motor, based on the rotational speed measured by said measuring means, so as to produce a calculated value of said characteristic, and value comparing means associated with said calculating means for providing a comparison of said calculated value with a set of predetermined slip values each corresponding to a resistive torque value and for determining the resistive torque value of the rotor of the centrifuge based on said comparison, said control unit further comprising: storing means for storing a set of resistive torque values each corresponding to a particular type of rotor and each associated with a maximum allowed rotational speed permitted for the particular type of rotor; and means for comparing the resistive torque of the rotor of the centrifuge determined by said value comparing means with the resistive torque values stored in said storing means so as to determine the rotor type of the rotor of the centrifuge and the associated maximum rotational speed thereof and for detecting an incompatibility between the maximum allowable rotational speed and a command to drive the rotor of the centrifuge at a rotational speed higher than the maximum allowable rotational speed for the rotor type of the rotor of the centrifuge.

2. A system for monitoring the operation of a centrifuge comprising an asynchronous electric motor operated by a control unit delivering to said motor an alternating power-supply voltage for controlling the rotational speed of the motor, said control unit comprising a device for determining the resistance torque of a centrifuge rotor driven in rotation in association with the asynchronous electric motor, and said device comprising:

means for measuring the rotational speed of the motor;

calculating means for calculating a characteristic that represents the motor slip to produce a calculated value of said characteristic;

comparing means, associated with said calculating means, for comparing the calculated value of said characteristic with a stored set of predetermined slip values, each corresponding to a resistive torque value and for thereby determining the resistance torque on the centrifuge rotor, said control unit further comprising storing means for storing a set of resistive torque values each corresponding to a type of rotor and each associated with a maximum allowable rotational speed permitted for the respective type of rotor and the centrifuge, and said comparing means comparing the resistive torque of the centrifuge rotor determined by said device with the resistive torque values stored in the storing means so as to determine the type of rotor and the associated allowable rotational speed, and detecting an incompatibility between the maximum allowable rotational speed and a command to drive the centrifuge rotor at a rotational speed higher than the associated maximum allowable rotational speed.

3. The system according to claim 2, wherein said calculating means comprises means for comparing the synchronous speed of the magnetic field of the motor with the measured rotational speed of the motor.

4. The system according to claim 2, wherein said characteristic is a characteristic that depends on temperature, and
wherein said system further includes means for measuring the air temperature around the rotor and for producing an output in accordance therewith,
said calculating means receiving said output and using said output in calculating said characteristic.

5. The system according to claim 2, wherein the control unit comprises limiting means for limiting the rotational speed of the rotor to a maximum permitted value of the rotational speed of the rotor.

6. A system for controlling operating parameters of a centrifuge comprising an asynchronous electric motor operated by a control unit delivering to the motor a power-supply voltage for controlling the rotational speed of the motor so as to control rotational driving of a centrifuge rotor arranged in a chamber of the centrifuge, and regulating means for regulating operating parameters of the centrifuge,
said control unit comprising a device for determining the resistive torque of the centrifuge rotor driven in rotation in association with the asynchronous electric motor, and said device comprising:
means for measuring the rotational speed of the motor;
calculating means for calculating a characteristic that represents the motor slip to produce a calculated value of said characteristic;
comparing means, associated with said calculating means, for comparing the calculated value of said characteristic with a stored set of predetermined slip values, each corresponding to a resistive torque value, and for thereby determining the resistive torque of the centrifuge rotor,
said control unit further comprising:
storing means for storing a set of resistive torque values each corresponding to a type of rotor and each associated with a set of operation regulating parameters for regulating the operation of the centrifuge corresponding to the type of rotor, and
said comparing means comparing the resistive torque of the centrifuge rotor determined by said device with the set of resistive torque values stored in the storing means so as to determine the type of rotor with which the centrifuge is equipped and delivering to the regulating means the values of the operation regulating parameters corresponding to the centrifuge rotor.

* * * * *